United States Patent
Miller et al.

(10) Patent No.: US 9,801,364 B1
(45) Date of Patent: Oct. 31, 2017

(54) KNOT-TYING TOOL

(71) Applicants: Herman Miller, Burbank, WA (US); Sandra Miller, Burbank, WA (US)

(72) Inventors: Herman Miller, Burbank, WA (US); Sandra Miller, Burbank, WA (US)

( * ) Notice: Subject to any disclaimer, the term of this patent is extended or adjusted under 35 U.S.C. 154(b) by 14 days.

(21) Appl. No.: 15/144,877

(22) Filed: May 3, 2016

(51) Int. Cl.
*A01K 91/04* (2006.01)

(52) U.S. Cl.
CPC .................... *A01K 91/04* (2013.01)

(58) Field of Classification Search
CPC ........ A01K 91/04; A01K 91/08; A01K 91/10; B65H 69/04
USPC ............... 289/1.2, 1.5, 17; 140/101, 149
See application file for complete search history.

(56) References Cited

U.S. PATENT DOCUMENTS

| | | | | |
|---|---|---|---|---|
| 465,894 | A * | 12/1891 | Stone | A01K 91/04 140/102 |
| 605,930 | A * | 6/1898 | Stauffer | B21F 3/04 140/104 |
| 2,783,571 | A * | 3/1957 | Stilwell | A01K 91/04 223/99 |
| 2,881,582 | A * | 4/1959 | Robbins | D07B 7/18 57/2.3 |
| 3,116,745 | A * | 1/1964 | Burning | A46B 17/06 134/158 |
| 3,125,836 | A * | 3/1964 | Printz | B24B 9/161 451/389 |
| 3,326,586 | A | 6/1967 | Frost | |
| 4,014,354 | A * | 3/1977 | Garrett | A61C 15/047 132/322 |
| 4,101,152 | A | 7/1978 | Gardipee | |
| 4,141,169 | A * | 2/1979 | Rieth | A01K 91/08 242/270 |
| D263,780 | S * | 4/1982 | Hildebrand | D6/552 |
| 4,566,213 | A | 1/1986 | Cossin | |
| 4,765,082 | A | 8/1988 | Nicholas | |
| 5,186,402 | A * | 2/1993 | Lin | A61M 5/3278 241/296 |
| D346,424 | S | 4/1994 | Rusztowicz | |
| 6,820,904 | B1 * | 11/2004 | Goldstein | A41D 25/08 289/1.5 |
| 6,935,515 | B1 * | 8/2005 | Sookoo | A46B 15/0091 211/65 |
| 6,952,855 | B2 * | 10/2005 | Lev | A61C 17/22 15/22.1 |
| D513,948 | S * | 1/2006 | Martin | D7/600.4 |

(Continued)

FOREIGN PATENT DOCUMENTS

WO 2012140420 A1 10/2012

*Primary Examiner* — Shaun R Hurley
*Assistant Examiner* — Bao-Thieu L Nguyen
(74) *Attorney, Agent, or Firm* — Kyle A. Fletcher, Esq.

(57) ABSTRACT

The knot-tying tool is a device that is used to assist in tying knots. The knot-tying tool is adapted for use with monofilament line. The knot-tying tool is further adapted for use with fishing hooks. The knot-tying tool includes a hook holder and a knotting post. The hook holder holds a fishing hook or a swivel such that a fishing line can be threaded through the fishing hook or swivel. The knotting post is a shaft around which the fishing line can be looped so as to assist in tying the knot attaching the fishing line to the fishing hook or swivel. The knot-tying tool includes a handle, a hook holder, a sleeve, and a knotting post.

20 Claims, 5 Drawing Sheets

(56) References Cited

U.S. PATENT DOCUMENTS

| | | | |
|---|---|---|---|
| 7,615,061 B2* | 11/2009 | White | A61B 17/0401 |
| | | | 289/17 |
| 7,716,771 B2* | 5/2010 | Kim | A61C 17/16 |
| | | | 15/21.1 |
| 8,074,814 B2* | 12/2011 | Morris | A47K 1/09 |
| | | | 206/362.1 |
| D656,345 S * | 3/2012 | Grimaldi | D6/686 |
| 8,181,674 B2* | 5/2012 | Schwartz | H01B 13/01209 |
| | | | 140/118 |
| 8,215,681 B2 | 7/2012 | Stevenson | |
| 8,562,396 B1* | 10/2013 | Piliguian | B24D 9/08 |
| | | | 125/15 |
| 9,084,414 B1* | 7/2015 | Fender | A01K 97/06 |
| 9,144,846 B2* | 9/2015 | Bernardi | B23B 31/201 |
| 2007/0244418 A1* | 10/2007 | Harkness | A61H 19/44 |
| | | | 601/72 |
| 2007/0293795 A1* | 12/2007 | Carroll | A61B 17/54 |
| | | | 601/138 |
| 2008/0061556 A1 | 3/2008 | Bernal | |
| 2008/0214097 A1* | 9/2008 | Kao | B24B 23/02 |
| | | | 451/344 |

\* cited by examiner

KNOT-TYING TOOL

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of animal husbandry not otherwise provided for, more specifically, a device that is used to join lines to lines or lines to objects.

SUMMARY OF INVENTION

The knot-tying tool is a device that is used to assist in tying knots. The knot-tying tool is adapted for use with monofilament line. The knot-tying tool is further adapted for use with fishing hooks. The knot-tying tool comprises a hook holder and a knotting post. The hook holder holds a fishing hook or a swivel such that a fishing line can be threaded through the fishing hook or swivel. The knotting post is a shaft around which the fishing line can be looped so as to assist in tying the knot attaching the fishing line to the fishing hook or swivel.

These together with additional objects, features and advantages of the knot-tying tool will be readily apparent to those of ordinary skill in the art upon reading the following detailed description of the presently preferred, but nonetheless illustrative, embodiments when taken in conjunction with the accompanying drawings.

In this respect, before explaining the current embodiments of the knot-tying tool in detail, it is to be understood that the knot-tying tool is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the knot-tying tool.

It is therefore important that the claims be regarded as including such equivalent construction insofar as they do not depart from the spirit and scope of the knot-tying tool. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
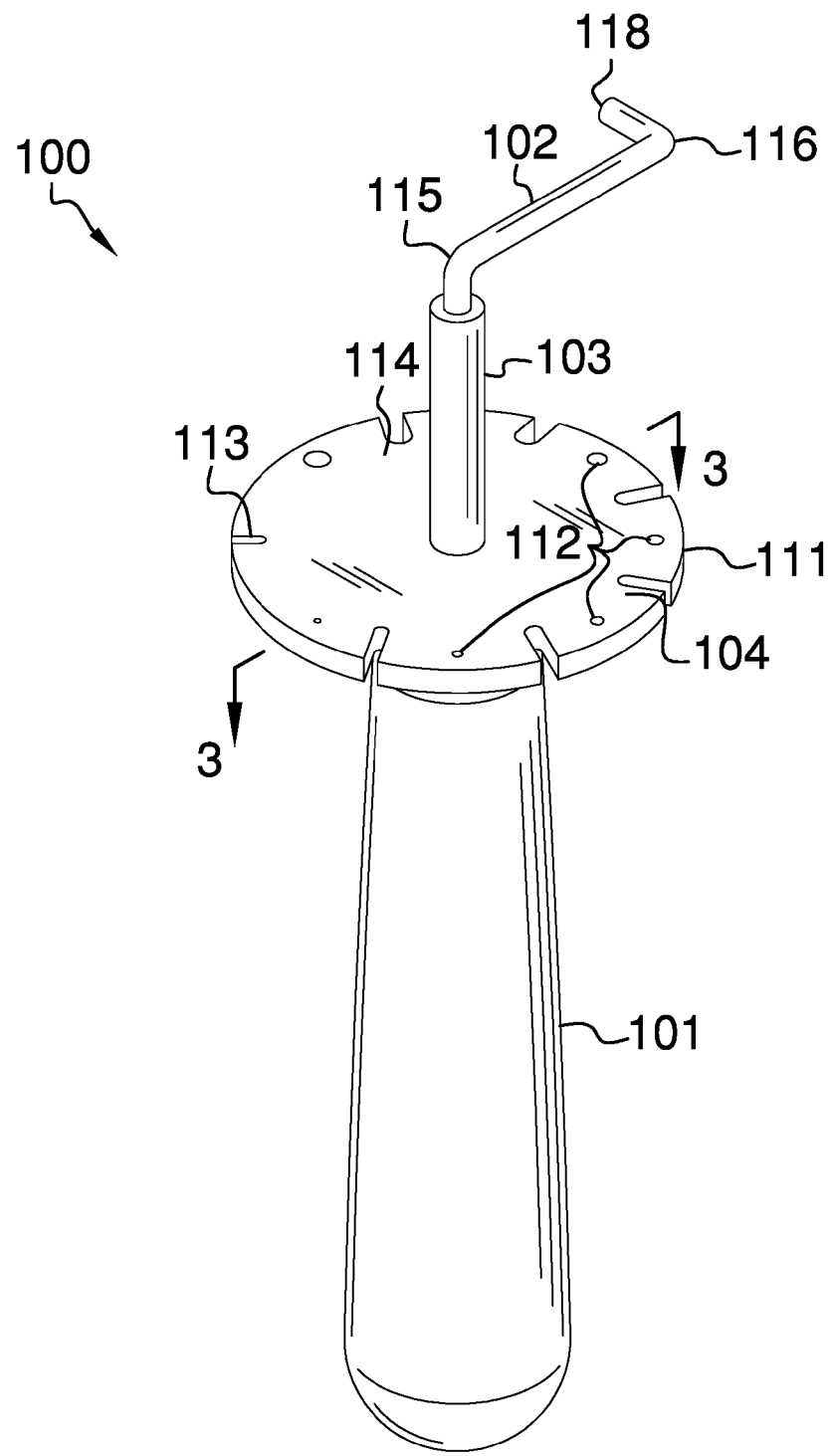
FIG. 1 is a perspective view of an embodiment of the disclosure.
Figure 2:
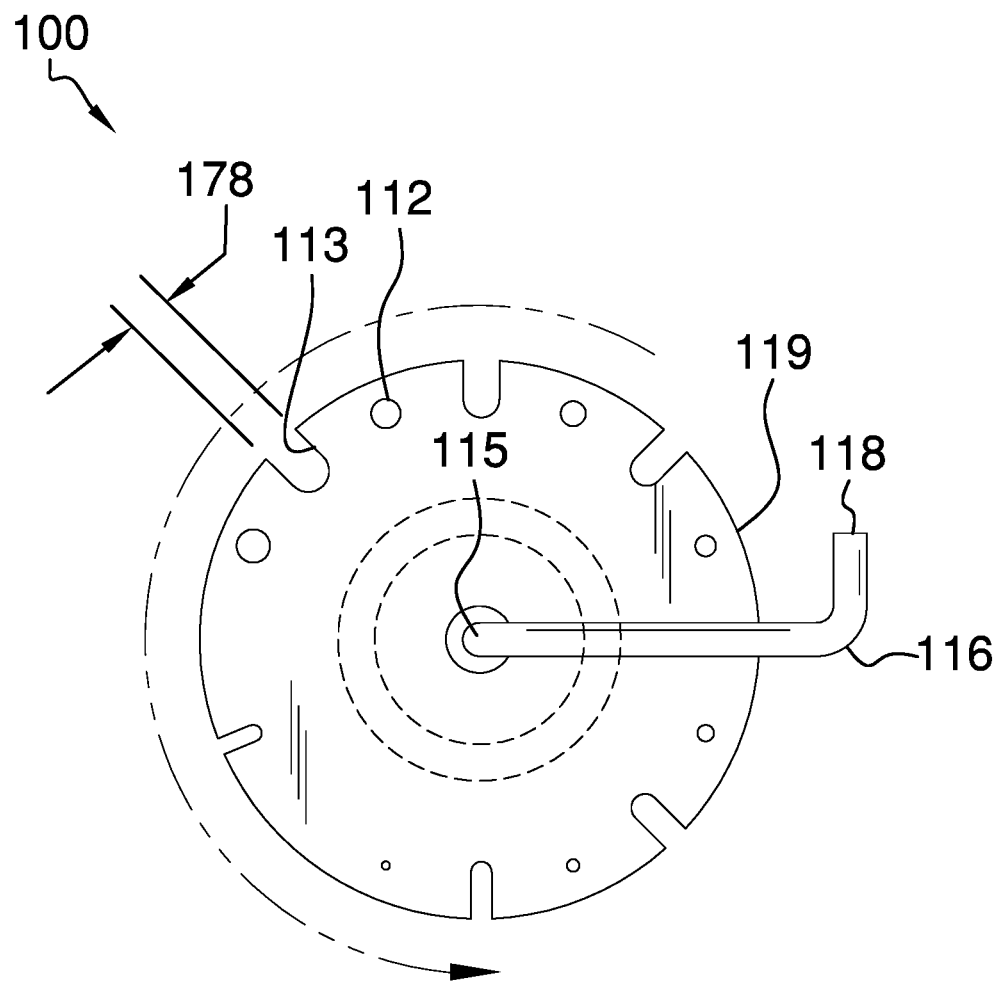
FIG. 2 is a top view of an embodiment of the disclosure.
Figure 3:
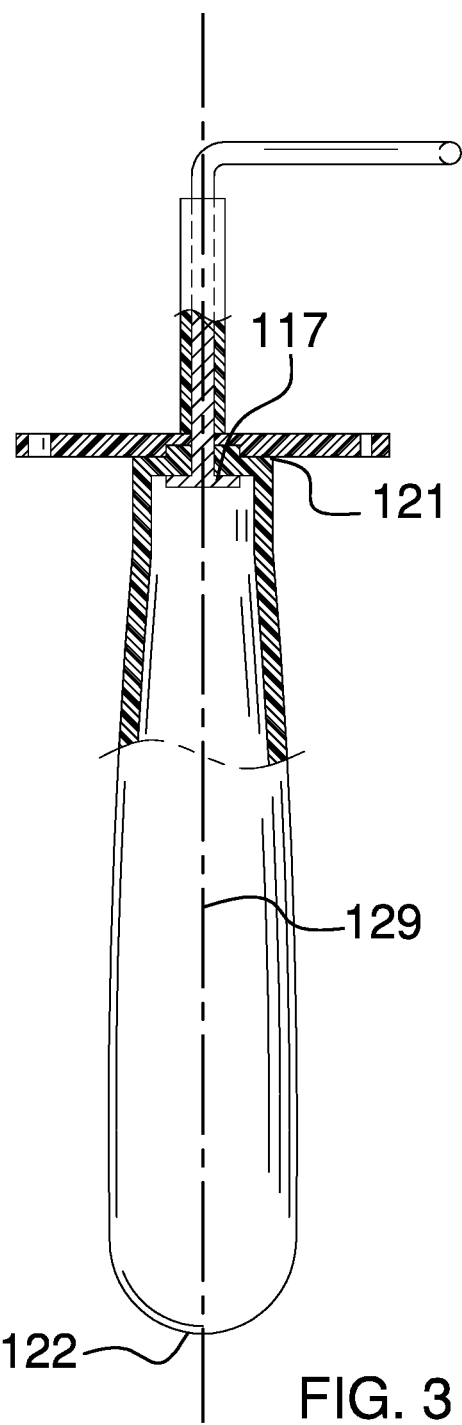
FIG. 3 is a cross-sectional view of an embodiment of the disclosure across 3-3 as shown on FIG. 1.
Figure 4:
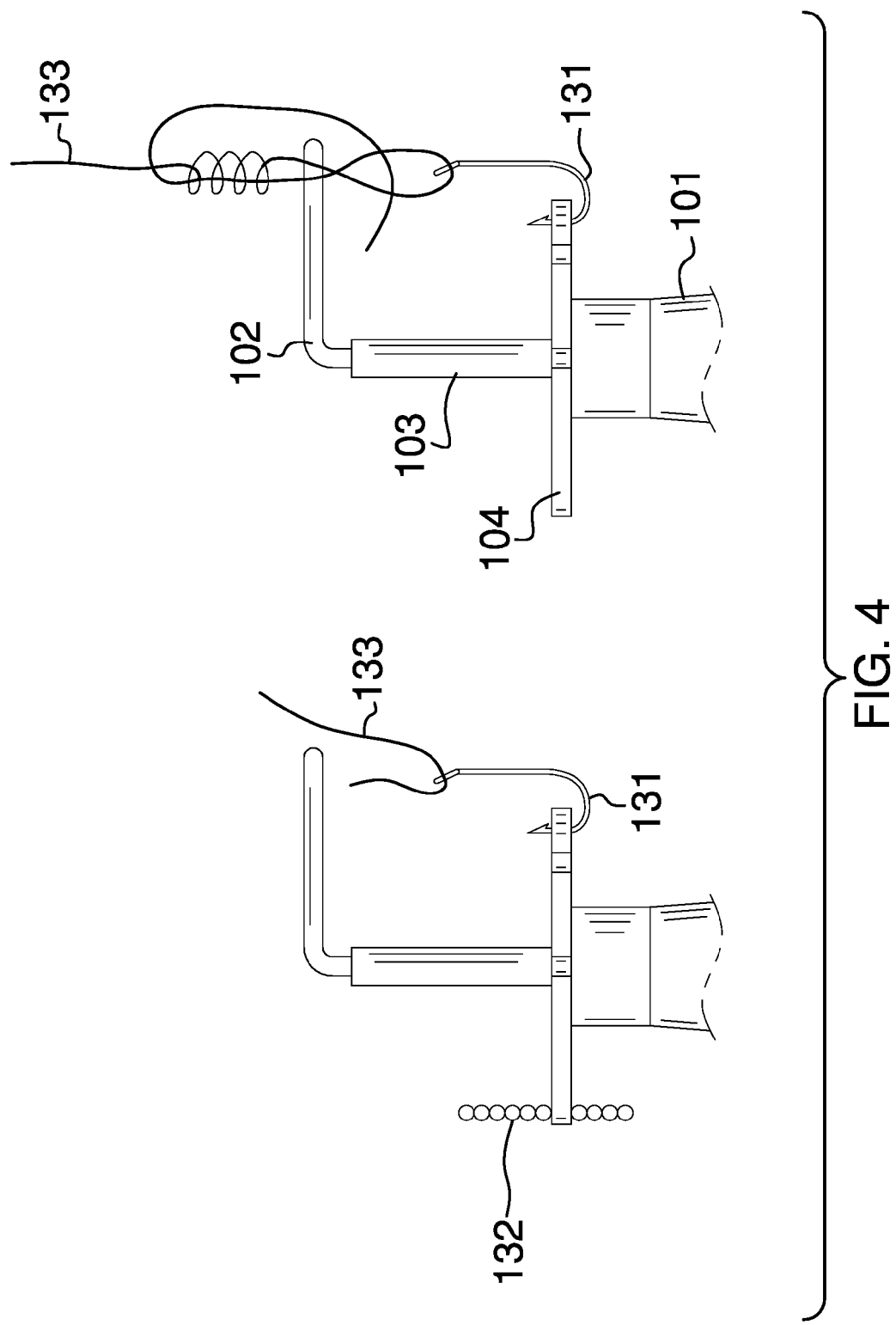
FIG. 4 is an in use view of an embodiment of the disclosure.
Figure 5:
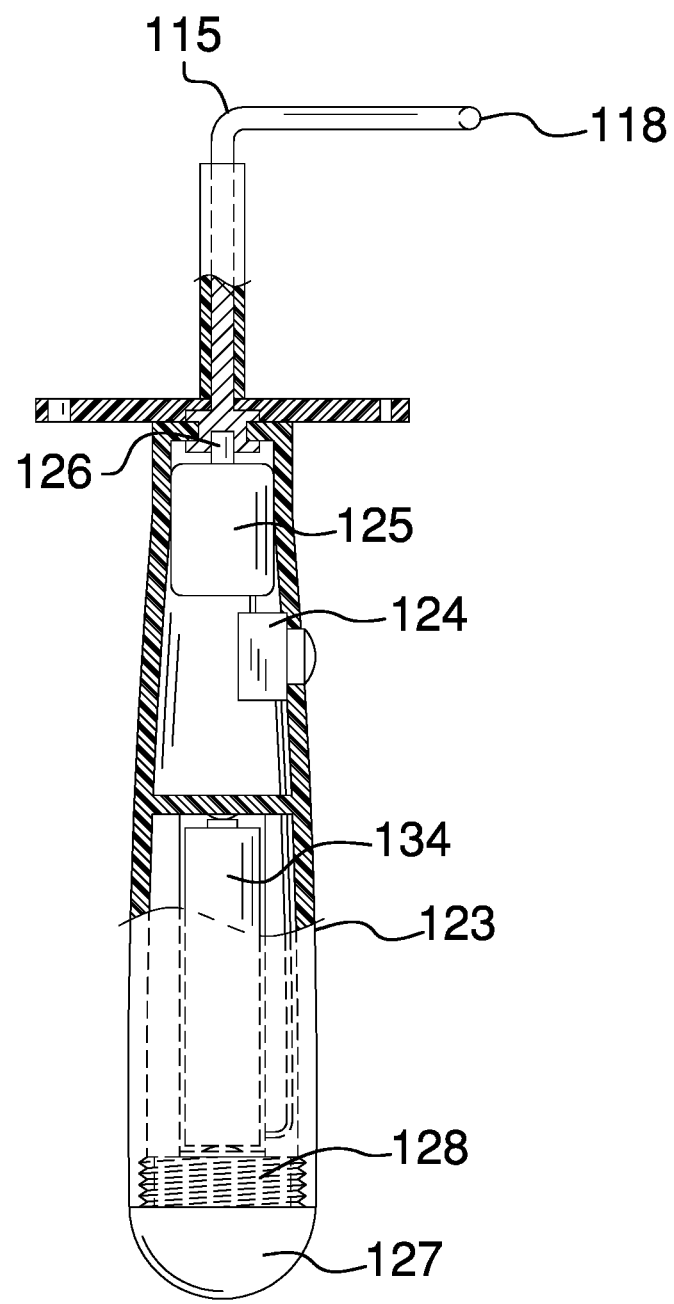
FIG. 5 is a side view of an alternate embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a plurality of potential embodiment of the disclosure, which is illustrated in FIGS. 1 through 5.

The knot-tying tool 100 (hereinafter invention) comprises a handle 101, a hook holder 102, a sleeve 103, and a knotting post 104. The invention 100 is a device that is used to assist in tying knots. The invention 100 is adapted for use with monofilament fishing line 133. The invention 100 is further adapted for use with fishing hooks 131 and fishing swivels 132. The hook holder 102 holds a fishing hook 131 or a swivel 132 such that a fishing line 133 can be threaded through the fishing hook 131 or the swivel 132. The knotting post 104 is a shaft around which the fishing line 133 can be looped so as to assist in tying the knot attaching the fishing line 133 to the fishing hook 131 or swivel 132.

The handle 101 is the grip that is used to hold and manipulate the device. The handle 101 is roughly cylindrically shaped and is further defined with a center axis 129. The handle 101 further comprises a first end 121 and a second end 122. The hook holder 102 is a disk 111. The hook holder 102 attaches to the first end 121 of the handle 101. The center of the disk 111 is aligned with the center axis 129 of the handle 101. The plane formed by the surface 114 of the disk 111 of the hook holder 102 is perpendicular to the center axis 129 of the handle 101. The perimeter 119 of the surface 114 of the disk 111 is formed with a plurality of hook holes 112. Each hook hole selected from the plurality of hook holes 112 is adapted to securely hold a fishing hook 131 of a specific diameter in position while the fishing line 133 is being attached to the fishing hook 131. Each of the plurality of hook holes 112 is a hole formed through the surface 114 of the disk 111. Each hook hole selected from the plurality of hook holes 112 differs from the hook holes remaining in the plurality of hook holes 112 in the span of the diameter of the each hook hole contained within the plurality of hook holes 112. The variation in the diameter of each hook hole contained within the plurality of hook holes 112 allows fishing hooks 131 of varying diameters to be secured within the hook holder 102.

At least one swivel slot 113 is also formed in the perimeter 119 of the disk 111. The at least one swivel slot 113 is a slot that is formed in the surface 114 of the disk 111. The at least one swivel slot 113 receives a swivel 132 that is adapted for use in fishing such that the at least one swivel slot 113 will securely hold the swivel 132 while a fishing line 133 is tied to the swivel 132.

Referring to FIG. 1, the at least one swivel slot 113 is provided adjacent to each of plurality of hook holes 112. The at least one swivel slot 113 may be referred to as a plurality of swivel slots 113. Moreover, each of the plurality of swivel slots 113 is further defined with a slot width 178. The slot width 178 varies as does the size of the adjacent one of the plurality of hook holes 113.

The sleeve 103 projects perpendicularly away from the surface 114 of the disk 111 such that the center axis 129 of the sleeve 103 is aligned with the center of the disk 111 and the center axis 129 of the handle 101. The sleeve 103 is sized to receive and securely hold the knotting post 104.

The knotting post 104 is a cylindrical shaft that is formed with a first right angle 115. The knotting post 104 is further defined with a third end 117 and a fourth end 118. The third end 117 is inserted and secured into the sleeve 103. As shown most clearly in FIG. 3, the first right angle 115 is formed between the third end 117 and the fourth end 118. The span of the knotting post 104 from the first right angle 115 to the fourth end 118 is greater than the span from the center of the surface 114 of the desk 111 to the perimeter 119 of the disk 111. The span of the knotting post 104 from the first right angle 115 to the fourth end 118 runs parallel to the surface 114 of the disk 111.

In a second potential embodiment of the disclosure, as shown most clearly in FIG. 1, a second right angle 116 is inserted into the knotting post 104 between the first right angle 115 and the fourth end 118. The span from the first right angle 115 to the second right angle 116 is greater than the span from the center of the surface 114 of the disk 111 to the perimeter 119 of the disk 111.

In the first potential embodiment of the disclosure and the second potential embodiment of the disclosure, the hook holder 102 and the knotting post 104 are installed such that the hook holder 102 and the knotting post 104 can rotate relative to each other. This allows the knotting post 104 to be rotated into a position relative to wherever the fishing hook 131 or swivel 132 are mounted upon the hook holder 102 such that this relative position facilitates tying the fishing line 133 onto the fishing hook 131 or the swivel 132. This relative rotation can be accomplished with several designs including, but not limited to: 1) sizing the sleeve 103 such that the knotting post 104 can be rotated relative to the disk 111; or, 2) mounting the disk 111 on the first end 121 of the handle 101 using a bearing that allows the disk 111 to rotate relative to the knotting post 104.

In a third potential embodiment of the disclosure, the first potential embodiment of the disclosure further comprises a battery chamber 123, a switch 124, an electric motor 125, a motor shaft 126, a cap 127, a threaded connection 128, and a battery 134. In this potential embodiment of the disclosure the knotting post 104 is rotated relative to the disk 111 by properly sizing the sleeve 103. The disk 111 is mounted in a fixed position. Furthermore, the handle 101 further comprises one or more chambers formed within the handle 101. The motor shaft 126 of the electric motor 125 is attached to the third end 117 of the knotting post 104. The electric motor 125 is mounted within the handle 101. The battery 134 and the switch 124 are selected, mounted, and wired such that by closing the switch 124 the electric motor 125 can be turned on and off. When the electric motor 125 is turned on, the motor shaft 126 rotates the third end 117 of the knotting post 104 thereby rotating the knotting post 104 relative to the disk 111. The battery 134 is stored within the battery chamber 123. Access to the battery chamber 123 is provided through the cap 127, which is attached using the threaded connection 128. The cap 127 is located at the second end 122 of the handle 101

In the fourth potential embodiment of the disclosure, the knotting post 104 of third potential embodiment of the disclosure is further formed with a second right angle 116 in a manner identical to that described in the second potential embodiment of the disclosure.

To use the invention 100, a fishing hook 131 is inserted into a hook hole selected from the plurality of hook holes 112 or a swivel 132 is inserted into the at least one swivel slot 113 and the fishing line 133 is threaded the fishing hook 131 or the swivel 132. The fishing line 133 is then looped around the knotting post 104 as an aid in attaching the fishing hook 131 or the swivel 132 to the fishing line 133.

The following definitions were used in this disclosure:

Battery: As used in this disclosure, a battery is a container consisting of one or more cells, in which chemical energy is converted into electricity and used as a source of power.

Center Axis: As used in this disclosure, the center axis is the axis of a cylinder like structure. When the center axes of two cylinder like structures share the same line they are said to be aligned. When the center axes of two cylinder like structures do not share the same line they are said to be offset.

Cylinder: As used in this disclosure, a cylinder is a geometric solid defined by two identical flat and parallel ends that are circular in shape and connected with a single curved surface wherein when the cross section of the cylinder remains the same from one end to another. The axis of the cylinder is formed by the straight line that connects the center of each of the two identical flat and parallel ends of the cylinder. In this disclosure, the term cylinder specifically means a right cylinder, which is defined as a cylinder wherein the curved surface perpendicularly intersects with the two identical flat and parallel ends.

Diameter: As used in this disclosure, a diameter of an object is a straight line segment that passes through the center of an object. The line segment of the diameter is terminated at the boundary of the object through which the line segment of the diameter runs.

Disk: As used in this disclosure, a disk is a cylindrically shaped object that is flat is appearance.

Perimeter: As used in this disclosure, a perimeter is one or more curved or straight lines that bounds an enclosed area on a plane.

Swivel: As used in this disclosure, a swivel is a device used in fishing to prevent a fishing line from twisting during use.

Tube: As used in this disclosure, a tube is a hollow rigid cylindrical device that can be used for transporting liquids and gasses.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A tool comprising:
a handle, a hook holder, a sleeve, and a knotting post;
wherein the tool is adapted for use tying knots;
wherein the tool is adapted for use with monofilament fishing line;
wherein the tool is adapted for use with fishing hooks;
wherein the tool is adapted for use with fishing swivels;
wherein the hook holder holds a fishing hook or a swivel such that a fishing line can be threaded through the fishing hook or the swivel;
wherein the knotting post is a shaft around which the fishing line can be looped so as to assist in tying the knot attaching the fishing line to the fishing hook or swivel;
wherein the handle is further defined with a first end and a second end;
wherein the handle is further defined with a center axis.

2. The tool according to claim 1 wherein the hook holder is a disk.

3. The tool according to claim 2 wherein the hook holder attaches to the first end of the handle.

4. The tool according to claim 3 wherein the center of the disk is aligned with the center axis of the handle.

5. The tool according to claim 4 wherein the plane formed by the surface of the disk of the hook holder is perpendicular to the center axis of the handle.

6. The tool according to claim 5 wherein the disk further comprises a plurality of hook holes.

7. The tool according to claim 6 wherein each hook hole selected from the plurality of hook holes differs from the hook holes remaining in the plurality of hook holes in the span of the diameter of the each hook hole contained within the plurality of hook holes.

8. The tool according to claim 7 wherein the disk further comprises at least one swivel slot.

9. The tool according to claim 7 wherein the disk further comprises a plurality of swivel slots; wherein the plurality of swivel slots are provided adjacent to the plurality of hook holes; wherein each of the plurality of swivel slots is further defined with a slot width; wherein the slot width varies in correlation with the size of the adjacent one of the plurality of hook holes.

10. The tool according to claim 9 wherein the sleeve is a tube that projects perpendicularly away from the surface of the disk such that the center axis of the sleeve is aligned with the center of the disk and the center axis of the handle; wherein the sleeve is sized to receive and securely hold the knotting post.

11. The tool according to claim 10
wherein the knotting post is a cylindrical shaft that is formed with a first right angle;
wherein the knotting post is further defined with a third end and a fourth end;
wherein the third end is inserted into the sleeve.

12. The tool according to claim 11
wherein the span of the knotting post from the first right angle to the fourth end is greater than the span from the center of the surface of the disk to the perimeter of the disk;
wherein the span of the knotting post from the first right angle to the fourth end runs parallel to the surface of the disk.

13. The tool according to claim 12 wherein the hook holder and the knotting post are installed such that the hook holder and the knotting post can rotate relative to each other.

14. The tool according to claim 13 wherein a second right angle is inserted into the knotting post between the first right angle and the fourth end.

15. The tool according to claim 14 wherein the span from the first right angle to the second right angle is greater than the span from the center of the surface of the disk to the perimeter of the disk.

16. The tool according to claim 12 wherein the tool a battery chamber, a switch, an electric motor, a motor shaft, a cap, a threaded connection.

17. The tool according to claim 16
wherein the disk is mounted in a fixed position;
wherein the handle further comprises one or more chambers formed within the handle;
wherein the motor shaft of the electric motor is attached to the third end of the knotting post.

18. The tool according to claim 16
wherein the switch is selected, mounted, and wired such that by closing the switch the electric motor can be turned on and off;
wherein when the electric motor is turned on, the motor shaft rotates the third end of the knotting post thereby rotating the knotting post relative to the disk.

19. The tool according to claim 15 wherein the tool a battery chamber, a switch, an electric motor, a motor shaft, a cap, a threaded connection.

20. The tool according to claim 19
wherein the disk is mounted in a fixed position;
wherein the handle further comprises one or more chambers formed within the handle;
wherein the motor shaft of the electric motor is attached to the third end of the knotting post;
wherein the switch is selected, mounted, and wired such that by closing the switch the electric motor can be turned on and off;
wherein when the electric motor is turned on, the motor shaft rotates the third end of the knotting post thereby rotating the knotting post relative to the disk.

* * * * *